May 3, 1960 N. L. COHEN 2,935,692

PHASE CONTROL SYSTEM

Filed March 8, 1954 4 Sheets-Sheet 1

INVENTOR.
NATHANIEL L. COHEN
BY George Sipkin
Lee J. Huntzberger
ATTORNEYS

May 3, 1960 N. L. COHEN 2,935,692

PHASE CONTROL SYSTEM

Filed March 8, 1954 4 Sheets-Sheet 2

INVENTOR.
NATHANIEL L. COHEN
BY George Lipkin
Lee J. Huntzberger
ATTORNEYS

May 3, 1960 N. L. COHEN 2,935,692

PHASE CONTROL SYSTEM

Filed March 8, 1954 4 Sheets-Sheet 3

INVENTOR.
NATHANIEL L. COHEN
BY
Max A. [signature]
ATTORNEYS

May 3, 1960 N. L. COHEN 2,935,692

PHASE CONTROL SYSTEM

Filed March 8, 1954 4 Sheets-Sheet 4

INVENTOR.
NATHANIEL L. COHEN
BY
Max D. Glasser
ATTORNEYS 2,935,692

PHASE CONTROL SYSTEM

Nathaniel L. Cohen, New Milford, N.J., assignor to the United States of America as represented by the Secretary of the Navy Application March 8, 1954, Serial No. 414,912

2 Claims. (Cl. 328—34)

This invention relates to a signal encoding and decoding system for facsimile and other type signals.

An object of this invention is to provide a superior encoding and decoding system for facsimile and like signals.

Other objects and many of the attendant advantages of this invention will be readily appreciated as the same becomes better understood by reference to the following detailed description when considered in connection with the accompanying drawings wherein.

Figure 3:
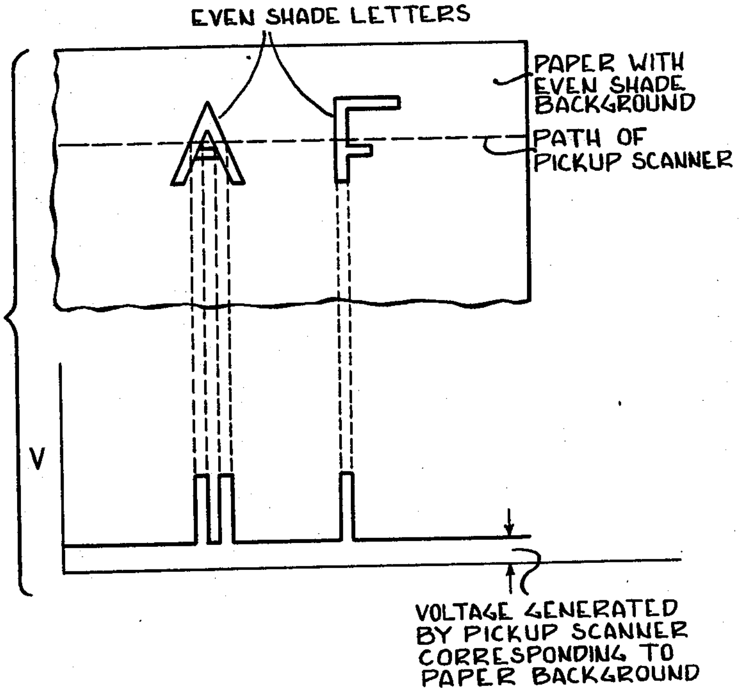
Fig. 3 illustrates a fascimile signal and Fig. 4 shows the signal of Fig. 3 after being encoded.

This invention can be used with a fascimile transmitter for encoding an outgoing signal and with a fascimile receiver for decoding a signal. Fig. 3 illustrates the general nature of a facsimile signal for a simple form of message, namely printed characters on paper of even color.

Figure 4:
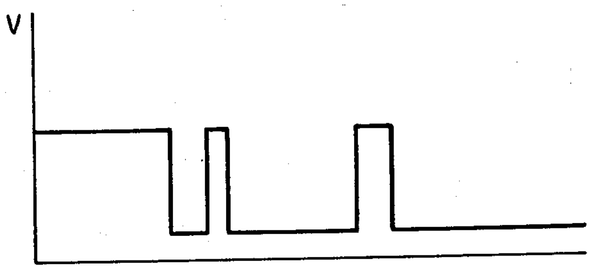
Figure 5:
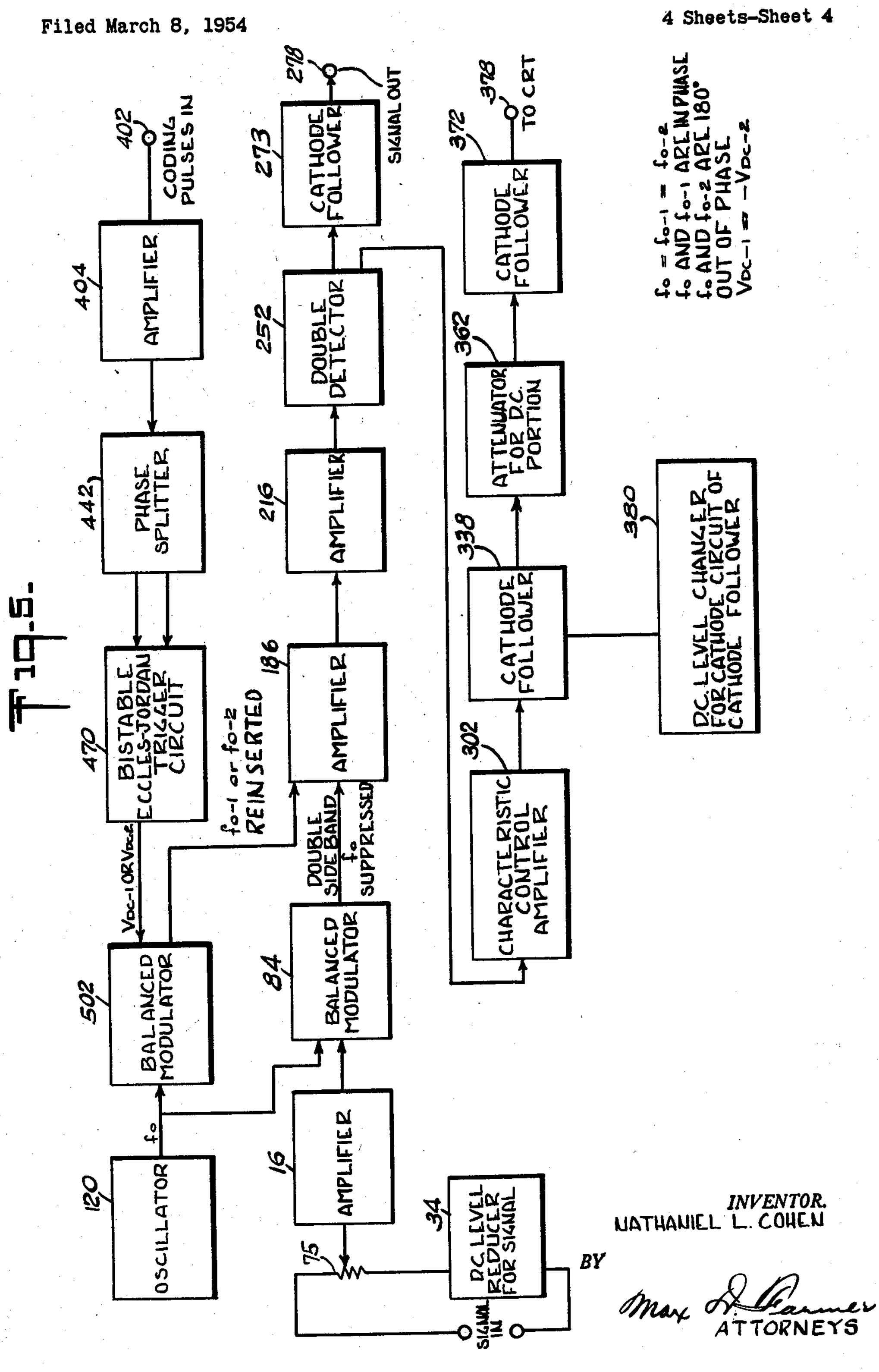
Fig. 5 is a block diagram of the embodiment illustrated in Figs. 1 and 2.

A facsimile signal can be encoded by adding pulses to the signal or by taking away pulses from the signal, in a random schedule. Fig. 4 illustrates what the signal of Fig. 3 can be changed to by this method. If an entire facsimile message is encoded by this method and the message is transmitted by conventional radio transmission, it may be intercepted by an unauthorized receiving station and reproduced on a sheet of paper in accordance with conventional fascimile principles, but the resultant facsimile recording not be intelligible. An authorized receiver supplied with proper decoding equipment can reproduce the fascimile message. The system shown in Figs. 1 and 2 is an equipment for accomplishing encoding and decoding of facsimile message.

Figure 1:
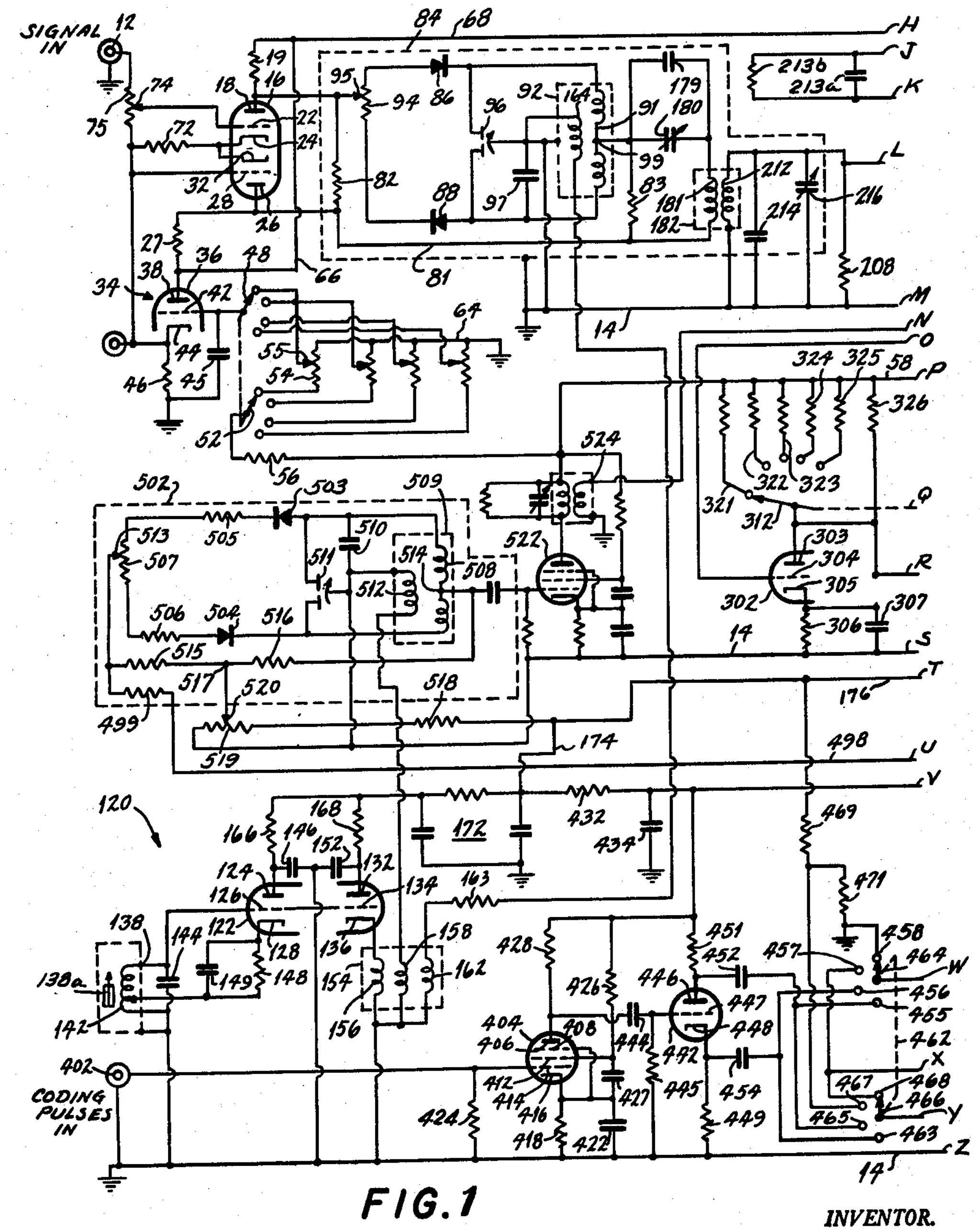
Fig. 1 and Fig. 2 are the two adjacent sections of a circuit diagram which together show an embodiment of this invention; the capital letters H through Z adjacent lead terminations on the right side of Fig. 1 and the capital letters H through Z adjacent lead terminations on the left side of Fig. 2 identify the proper connections of the two adjacent sections of the circuit diagram.
Figure 2:
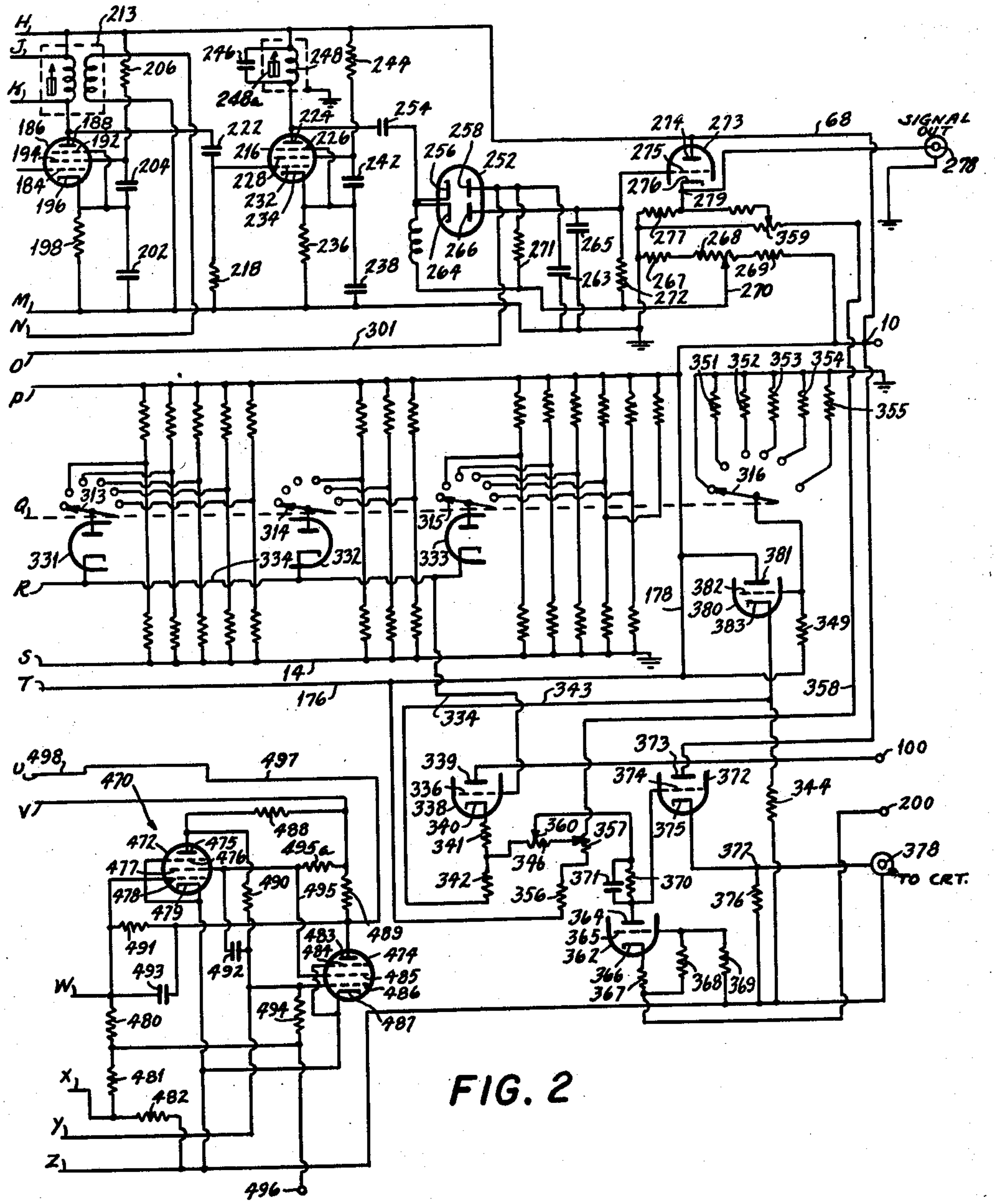

The circuit illustrated in Figures 1 and 2 includes a terminal 10, on the right side of Fig. 2, which is adapted to be connected a source of regulated plate voltage, not shown. An input terminal 12 is provided for the incoming signal; the incoming signal is applied between the input terminal 12 and a source of reference potential hereinafter referred to as ground and generally shown by the conventional ground symbol and by lead 14; in this description it may be considered that the signal is obtained from a demodulator of a preceding stage. A balanced direct current amplifier including a double triode 16 is connected in circuit with the input terminal 12. This amplifier is of the type described in volume 18 of Mass. Inst. of Tech. Radiation Laboratory Series entitled "Vacuum Tube Amplifiers," published by McGraw-Hill, 1948; see Figures 11–29 and pages 447 et seq. The double triode 16 includes a first triode section having a plate 18, a plate-load resistor 19, a grid 22, and a cathode 24, and a second triode section having a plate 26, a plate-load resistor 27, a grid 28, and a cathode 32. A cathode loaded triode stage 34 is provided for reducing the D.C. level of the incoming signal at the grids 22 and 28 of the double triode 16 to substantially clamp the incoming signal to ground. The need for stage 34 arises were the input at terminal 12 is a detected facsimile signal, or the like, which is a D.C. signal relative to ground having a D.C. component which defines the baseline of the facsimile signal; stage 34 balances out the D.C. component. The stage 34 includes a triode 36 having a plate 38, a grid 42, and a cathode 44. The loading for the triode 36 is provided by the cathode resistor 46. An audio frequency bypass condenser 45 is connected between grid 42 and ground. The bias on the grid 42 of the tube 36 is controlled by a four-position stepping switch having a pair of contactor arms 48 and 52. Contactor arms 48 and 52 are joined for movement as a unit. Contactor arms 48 and 52 serve to provide the grid 42 with four separate selective levels of bias. For example, in the position shown, the switch arms 48 and 52 are cooperatively related to a voltage divider circuit which includes the potentiometer 54, the fixed resistor 56, a lead 58 which connects the fixed resistor 56 to the plate supply terminal 10. One end of the potentiometer 54 is grounded by means of a lead 64. The switch arm 48, in the position shown, is connected to the tap 55 of the potentiometer 54 and the switch arm 52 connects the end of the potentiometer 54 opposite that end which is grounded, in series with the fixed resistor 56. By selective movement of the joined switch arms 48 and 52, the bias on the grid 42 is set at different levels. The plate 38 of the tube 36 is connected to the same plate supply terminal 10 by means of a lead 66 which is connected to the plate supply lead 68. A voltage is developed across the cathode resistor 46, the magnitude of which is based upon the tube current. A range of tube current is provided for by means of the selector switch and selectively adjustable voltage dividers described above for clamping the signal to ground. Stage 34 in reducing the D.C. level of the incoming signal serves to minimize saturation of amplifier 16.

The double triode 16 is connected to the plate supply terminal 10. The plate load resistors 19 and 27 are identical. The cathodes 24 and 32 of the double triode 16 are joined. The tube 16 has a common heater filament, not shown, for both cathodes. A cathode resistor 72 is provided for obtaining grid bias.

The voltage at the plate 18 equals the voltage at the plate 26 when there is no input signal. The arrangement of the balanced D.C. amplifier tube 16 compensates for variations in the filament heater voltage and plate supply voltage.

The grid 22 of the double triode 16 is connected to the tap 74 of potentiometer 75. A fraction of the audio input signal is selectively picked off the potentiometer and applied between grid 22 and cathode 24. None of the audio input signal is applied between grid 28 and cathode 32. Therefore, there is developed a potential difference between the plates 18 and 26 of the double triode 16, the potential difference being the amplified audio frequency component of the signal input at terminal 12. The output of the balanced D.C. amplifier which includes the double triode 16 is fed to a balanced modulator 84 of the double side-band suppressed carrier type. The modulator 84 comprises two diodes 86 and 88, connected in series in the same direction, the secondary 91 of a pulse transformer 92, a balancing potentiometer 94, and a balancing capacitor arrangement including variable capacitor 96 and fixed capacitor 97. The modulator is designed so that there is complete impedance balance between the tap 95 of potentiometer 94 and the modulator output terminal 99. The operation of the modulator is subsequently described.

The carrier frequency oscillator for the circuit is shown at 120 and is of the Hartley type. It includes a double triode tube 122. The section of the triode 122 including the plate 124, control grid 126 and cathode 128 serves as that part of the oscillator circuit 120 that determines and governs the output frequency whereas the other section of the triode including the plate 132, the control grid 134, and the cathode 136, which section is hooked up as a cathode follower serves to furnish the load current. Better frequency stability is obtained by not loading down the first section of the oscillator. If the first section of the oscillator were loaded, the frequency would change as the load changed. The tuned tank circuit 138 including the coil 142, tuning slug **138*a*, and the fixed condenser 144 is connected between the grid 126 and ground lead 14. The feedback loop includes the blocking condenser 146 for coupling only the radio frequency voltage to ground lead 14. The grid bias for the first section of the oscillator is provided by cathode resistor 148 shunted by the cathode bypass condenser 149. The other half of the triode 122 which is connected as a cathode follower is coupled to the first section by the joining of the grids 126 and 134. Condenser 152 which is identical to the condenser 146 is connected between the plate 132** and ground to prevent unwanted coupling of the radio frequency energy into other portions of the circuit.

Each of the plates 124 and 132 of the oscillator triode 122 are connected through identical plate-load resistors 166 and 168 to a resistance-capacitance filter 172, through the jumper lead 174, across on the lead 176, up on the lead 178 to the plate supply terminal 10. The filter 172 includes radio frequency bypass condensers to keep the radio frequency energy out of the plate supply and also to prevent stray capacitive coupling. No radio frequency choke is needed for the plate supply since the oscillator is grounded at the plate through a radio frequency bypass condenser.

A three-winding transformer 154 whose primary winding is connected in series between the cathode 136 and ground lead 14 includes a pair of secondary windings 158 and 162. One end of each of the secondary windings 158 and 162 are connected to ground lead 14. The secondary coil 162 of the transformer 154 is connected in series with a current-limiting resistor 163 and with the primary winding 164 of the pulse transformer 92 in the modulator circuit 84. The end of primary winding 164 opposite that connected to the resistor 163 is grounded by connection to lead 14.

The modulator 84 is balanced as follows: Assuming that the stray capacity of the upper half of the secondary 91 of the transformer 92 is considerably greater than that of the lower half due to variations in manufacture, the condenser 97 is connected in parallel with the stray capacity of the lower half of the secondary 91 of the transformer 92. Through the addition of the condenser 97 the stray capacity of the upper half of the secondary 91 of the transformer 92 and the lower half of the secondary 91 of the transformer 92 are made substantially equal to one another. Fine adjustment and balance of the capacities of both halves of the secondary 91 of the transformer 92 is achieved through adjustment of the condenser 96. When the condenser 96 is finally adjusted the stray capacities between the centertap and both ends of the secondary 91 of the transformer 92 are equal. Balancing out the difference in the resistance between the germanium diodes 86 and 88 is achieved through the potentiometer 94. Through adjustment of the tap 95 of the potentiometer 94 the resistance of both paths between the tap 95 and the centertap 99 of the secondary 91 of the transformer 92 are made equal.

A voltage reference means for the modulator 84 is provided by the lead 81. The potential at the input of the modulator which is at potentiometer tap 95 and the output at the terminal 99 which is the centertap of the secondary 91 of the transformer 92 are both referenced to the lead 81. The potential of the lead 81 is kept fairly constant with respect to ground through the action of the lower half of the double triode 16 as explained above. Connected between the two plates 18 and 26 of the double triode 16 is a resistor 82. Connected between the output terminal 99 of the modulator and the lead 81 is an identical resistor 83. This arrangement of the two resistors 82 and 83 provides for balancing out changes resulting from fluctuations in the filament voltage of the plate voltage of the tube 16. For example, if the filament voltage increases, more current flows through the tube. The voltage at the plate 18 and the voltage at the plate 26 drops by a like amount due to this change in filament voltage. There is no resulting output signal to the remainder of the circuit. The voltage across the resistor 82 due to the audio frequency component of the input signal at the terminal 12 is not affected. Because of the presence of the resistor 83, which is identical to resistor 82, between the output terminal 99 and the reference lead 81, the voltage at the terminal 99 changes in the same direction and by an equal amount as the change that occurs at the tap 95 of the potentiometer 94 as a result of filament voltage or plate voltage changes. Consequently, changes in filament or plate voltage do not cause any signal to be generated.

In operation, the modulator 84 which is only a half ring and therefore is a half wave affair permits radio frequency current to flow around the ring only in one direction, that direction being clockwise as shown on the drawing. A complete ring has four diodes and is a full-wave affair. However, the half ring has half the number of components and thus is more stable because there are fewer components that can vary. When the output of the half ring is filtered, the output waveform is not very different from that obtained from a complete ring. The amplitude of the carrier frequency voltage generated in each half of the secondary 91 is equal to or greater than the amplitude of the audio frequency voltage fed into the ring through the tap 95 of the potentiometer 94. In the absence of any signal input at the tap 95 no voltage is developed across the resistor 83 and the primary 181 of the transformer 182. There is only a radio frequency circulating current in the ring. Therefore, there is no carrier frequency output. However, when an audio signal is developed across the resistor 82, it adds to and subtracts from the carrier whereby the sidebands are obtained.

Considering for the moment that the audio frequency voltage at the tap 95 is going positive, radio frequency current flows clockwise through the upper part of the ring whenever the instantaneous potential of the signal is more positive than is the upper end of the secondary 91 with respect to centertap 99. Otherwise, no current flows through the upper part of the ring. Correspondingly, current starts flowing through the lower part of the ring when the lower end of the secondary 91 goes more positive with respect to centertap 99 than the instantaneous positive potential of the input signal. Therefore, the radio frequency voltage developed across the resistor 83 has a certain phase relationship to the carrier when the voltage at tap 95 is going positive, and when the potential of the input signal at 95 begins to go negative with respect to the tap 99, the resulting output voltage is developed in the same manner except that the phase of the latter is displaced 180°. The envelope of the output waveform varies at a double frequency rate with the radio frequency voltage of each adjacent cycle of the output waveform being 180° out of phase.

Without carrier reinsertion, the output of the detectors, subsequently described, is the second harmonic of the input audio signal. With carrier reinsertion, the original audio signal waveform is reproduced. If the reinserted carrier has the same phase as the carrier applied to the ring modulator 84, the output will have the same polarity as the audio input. If the reinserted carrier is opposite in phase (a 180° phase shift), the polarity of the output will be reversed with respect to the audio input signal.

The output voltage of the ring modulator 84 is coupled to grid 184 of the tuned plate amplifier tube 186 by transformer 182. Fixed condenser 179 in parallel with tuning condenser 180 tunes the primary of the transformer 182. Likewise, the fixed condenser 214 in parallel with tuning condenser 216 tunes the secondary of the transformers 182. The harmonics created by the use of the half ring are thereby eliminated. Thereby there is obtained what approximates a fairly good sine wave though of less amplitude than if a full-wave device were used as the modulating unit.

The amplifier tube 186 includes a plate 188, a suppressor grid 192, a screen grid 194, control grid 184, and a cathode 196. The suppressor grid 192 is connected to the cathode 196. The tube is self biased by a cathode resistor 198 shunted by a bypass condenser 202. The screen grid 194 is connected to the junction between the resistor 206 and the condenser 204. The opposite end of resistor 206 is connected to the plate supply lead 68 and the opposite end of condenser 204 is connected in series with cathode bypass condenser 202. A grid-leak resistor 208 is connected between the grid 184 and the ground lead 14. The input to the grid 184 is obtained, as stated above, through the tuned circuit comprising the secondary 212 of the transformer 182 and the fixed condenser 214 plus the variable tunning condenser 216. The carrier, suppressed in the ring modulator 84, is reinserted at the tuned plate circuit of the amplifier tube 186 through a transformer 213. The tuned plate circuit includes the secondary of the transformer 213, condenser **213*a*, and a resistor 213*b* for lowering Q to provide for the desired bandwidth. The output of this amplifier stage which now includes the reinserted carrier is fed through an amplifier tube 216 through a resistor condenser coupling consisting of a resistor 218 and a condenser 222. The amplifier tube 216 is connected in circuit similarly to the amplifier tube 186. Tube 216 includes a plate 224, a suppressor grid 226, a screen grid 228, a control grid 232, and a cathode 234. Suppressor grid 226 is connected to the cathode 234. Grid bias is provided by means of a cathode resistor 236 shunted by a cathode bypass condenser 238. The screen grid 228 is connected between resistor 244 and condenser 242, the other end of resistor 244 being connected to the plate supply lead 68 and the other end of the condenser 242 being connected in series with the cathode bypass condenser 238. Connected in the plate circuit of the amplifier tube 216 is a tank circuit including a condenser 246 and a coil 248 having a tuning slug 248*a***. The circuit is tuned to eliminate harmonics.

The output of the amplifier tube 216 is fed to a double diode detector 252. A radio frequency coupling condenser 254 is connected between the plate circuit of the tube 216 and the cathodes 256 and 264 of double diode 252. The plate 258 of the double diode 252 is coupled to ground lead 14 by means of a radio frequency bypass condenser 263. The plate 266 of the double diode 252 is coupled to ground lead 14 by a radio frequency bypass condenser 265. The plate supply for the double diode 252 is derived from a voltage divider including, in series, resistor 267, potentiometer 268, and resistor 269. They are connected between the plate supply terminal 10 on the ground lead 14. The potentiometer tap 270 is connected to each of the plates 258, 266 of the double diode 252 through respective plate load resistors 271 and 272. The audio frequency output derived at the plate 266 is direct coupled to a cathode follower 273. The follower tube 273 includes a plate 274, a control grid 275, and a cathode 276. The plate 274 of the cathode follower 273 is connected directly to the plate supply terminal 10 through the plate supply lead 68. A cathode resistor 277 connects the cathode 276 to ground lead 14. The output terminal 278 is connected to the junction 279 between the cathode resistor 277 and the cathode 276.

The output detected at the other plate 258 is coupled through a lead 301 into the tube 302 of a characteristic control amplifier. The tube 302 is a triode and includes a plate 303, a control grid 304, and a cathode 305. The tube 302 is self biased by means of a cathode resistor 306 shunted by a cathode bypass capacitor 307. The plate 303 of the tube 302 is arranged to be connected to the plate supply terminal 10 through any one of a series of plate-load resistors 321, 322, 323, 324, and 325. A plate load resistor 326 is permanently in circuit between plate 303 and plates supply terminal 10. There are also adapted to be connected into the circuit of the plate 303 of the tube 302 a plurality of diodes 331, 332, and 333. The cathodes of each of said diodes are joined together by a lead 334, the latter being connected directly to the plate 303 of the triode 302. The potentials on each of the plates of the diodes 331, 332, and 333, are adapted to be varied in steps over a range. Potentials for the plates of each of the diodes 331, 332, and 333, are provided by means of voltage divider circuits, each of which are connected between the plate supply terminal 10 and the ground lead 14. A switch having a plurality of contactor arms 312, 313, 314, 315, and 316, each of which is joined to one another to move as a unit, are arranged in circuit with each of the plates of the tubes 302, 331, 332, and 333. The purpose of the contactor arm 316 will become evident as the description proceeds.

The operation of the characteristic control amplifier is such as to expand the signal in six steps. The transfer characteristic of the device has six possible characteristics that range from linear signal reproduction to a maximum exponential form in terms of the amplitude characteristics of the input signal. Each of the diode circuits represents an impedance connected in parallel with the plate load impedance of the tube 302. If the parallel impedance is changed, the effective plate load impedance is changed correspondingly. The output of the expander circuit is fed by means of the lead 334 to the grid 336 of the triode 338. The tube 338 further includes a plate 339 and a cathode 340. The plate 339 is connected to a terminal 100 to which is adapted to be connected a second plate supply source, not shown, providing a regulated voltage greater than that of the plate supply source adapted to be connected to the terminal 10. The cathode 340 of the triode 338 is connected to ground lead 14 through series connected resistors 341, 342, the lead 343, and the resistor 344. The tube 338 is utilized as a cathode follower.

A tube 380, in series with resistor 344, is used as a D.C. A potentiometer 346 connected at one end thereof to the junction of resistors 341 and 342 and at its other end to a voltage divider connected between ground and terminal 10 is arranged so that only the signal appears across it, due to the action of tube 380. The tube 380 includes a plate 381, a control grid 382, and a cathode 383. The cathode 383 is connected directly to the resistor 344. The plate 381 is connected to the plate supply terminal 10. The potential on the grid 382 is determined by the position of the contactor 316 of the stepping switch in the characteristic control amplifier. In the position of the stepping switch shown on the drawing, the contactor arm 316 is connected directly to ground. Therefore, the resistor 349 which is connected to the plate supply terminal 10 through the lead 178 at one of its ends and to the grid 382 at the other one of its ends, puts the grid 382 at ground potential. At each progressive clockwise position of the contactor arm 316, the latter is connected in series with resistors 351, 352, 353, 354, 355, respectively. The resistors increase in magnitude in the order recited so that at each progressive position the grid 347 is raised to a higher potential above ground. As a result, with each progressive clockwise position more current flows through the resistor 344, raising the D.C. level at the cathode resistors 341 and 342 of tube 338. The voltage divider to which is connected one end of the potentiometer 346, includes resistor 356 in series with potentiometer 357, connecting lead 358 and the potentiometer 359. The opposite end of potentiometer 359 is connected to ground lead 14. By this arrangement including the D.C. level changer tube 380 and the voltage divider, the D.C. potential across the potentiometer 346 is reduced to zero so that only the signal appears across it.

The voltage at the tap 360 of the potentiometer 346 with respect to ground is very high. Therefore, the output is fed to a triode tube 362 where the D.C. component with respect to ground, is reduced in effect to zero at the plate. This portion of the circuit is described in greater detail in copending application Serial Number 414,911, filed March 8, 1954, for Voltage Divider, by Edgar Van Winkle and having the same assignee as herein. Triode 362 includes a plate 364, a grid 365, and a cathode 366. A cathode resistor 367 connects the cathode 366 to a terminal 200, the potential of which is maintained at a level considerably below ground by a power supply means, not shown. The bias on the grid 365 is provided by a voltage divider including the resistors 368 and 369. The resistors 368 and 369 are connected in series between ground lead 14 and the terminal 200 which is at a potential considerably below ground. The grid 365 which is connected between the junction of the two resistors 368 and 369 is thereby maintained at a fixed potential below ground. In series with the tap 360 of the potentiometer 346 is a plate load resistor 370. The plate load resistor 370 is shunted by a radio frequency bypass condenser 371. The output at the plate 364 of the tube 362 is D.C. coupled to the output cathode follower triode tube 372. The triode tube 372 includes a plate 373, a control grid 374, and a cathode 375. The plate 373 of the output cathode follower 372 is connected to the plate supply terminal 10. The cathode resistor 376 connects the cathode 375 of the output cathode follower tube 372 to ground lead 14. The output of the cathode follower tube 372 which is derived at the junction 377 between the cathode 375 and the cathode 376 has an output containing only a low D.C. component. The component is not reduced to zero due to the fact that a cathode follower is non-linear in this region, and serious distortion would result. The terminal 377 is connected to an output terminal jack 378. Therefore, two outputs are provided at the terminal jacks 278 and 378, respectively, the outputs differing in magnitude. The carrier frequency voltage, which is reinserted at the plate 188 of the amplifier tube 186, is derived through an intermediate balanced modulator 502. The circuit 502 serves as a means for reversing the phase of the carrier frequency obtained from oscillator 120. The components of the modulator circuit 502 correspond to the components of the modulator circuit 84. The ring circuit 502 includes a pair of identical commercial diodes 503 and 504, which are connected in series to permit current to flow in the same direction. A pair of resistors, one of which 505, and the other of which 506, are connected in series with the diodes 503 and 504, respectively, are provided for balancing purposes and for increasing the series impedance of the ring. Fine resistive balance is accomplished by means of the potentiometer 507. Connected in series between the diodes 503 and 504 is the secondary 508 of the transformer 509. The stray capacity of the secondary 508 of the transformer 509 is balanced by means of the fixed capacitor 510, which serves to balance substantially all of the stray capacity in the lower half of the secondary coil 508, and the fine tuning capacitor 511 which provides the final capacitive balance. The transformer 509 has a primary winding 512. One end of the primary winding 512 is connected to ground lead 14. The other end of the primary winding 512 is connected directly in series with the secondary 158 of the transformer 154 of the oscillator circuit 120. The signal input to the circuit 502 is at the tap 513 of the potentiometer 507. The output of the circuit 502 is at the center tap 514 of the secondary 508. Connected between the input 513 and the output 514 are a pair of resistors 515 and 516. The junction 517 between the resistors 515 and 516 is maintined at a substantially fixed D.C. potential. The substantially fixed D.C. potential at the terminal 517 is provided by means of a voltage divider including fixed resistor 518 connected in series with potentiometer 519. One end of the resistor 518 is connected to the plate supply lead 176 and thereby to the plate supply terminal 10. The far end of the potentiometer 519 is connected to the ground lead 14. The potentiometer tap 520 is arranged for selecting the D.C. potential, within limits, for the terminal 517 between the resistors 515 and 516. For the same reasons given in connection with the modulator circuit 84, any fluctuation in the plate supply potential at the terminal 10 would not cause any output signal to be generated by the modulator 502. The signal input at the tap 513 is arranged to have either one of two values. It either has a predetermined positive potential or a predetermined negative potential. The potential at the tap 513 alternates between the two aforementioned values. The means for doing the alternating is a code signal source, not shown, arranged for controlling a single-shot multivibrator or flip-flop circuit to be subsequently described. If the alternate positive or negative potentials applied to the tap 513 follow a predetermined schedule and the same schedule is followed synchronously both at the transmitter and the receiver embodying this invention, the transmitted intelligence is coded.

Means for providing the coding pulses, not shown, is adapted to be connected to the code input terminal 402. The coding pulses made available at the terminal 402 are coupled into an amplifier 404. The amplifier 404 includes a plate 406, a suppressor grid 408, a screen grid 412, a control grid 414 and a cathode 416. Cathode 416 is connected to the ground through a cathode bias resistor 418. The resistor 418 is shunted by a cathode bypass capacitor 422. A grid-leak resistor 424 is connected between the grid 414 and the ground lead 14. The plate 406 is connected to the plate supply terminal 10 through a plate-load resistor 428 in series with the resistor 432, the jumper lead 174, and the plate supply lead 176. A condenser 434 connected between one end of the resistor 432 and ground for bypassing audio frequency energy to ground. Suppressor grid 408 of the tube 404 is connected to the cathode 416. A resistor 426 is connected to the end of the resistor 428 furthest from the plate 406. The opposite end of the resistor 426 is connected in series with a condenser 427, which in turn is connected in series with the cathode bypass condenser 422. The screen grid 412 is connected to the junction between the resistor 426 and the condenser 427. The output of the amplifier tube 404 is coupled into a phase splitter including the triode 442 by means of a condenser 444 and a grid-leak resistor 445. The triode 442 includes a plate 446, a control grid 447, and a cathode 448. The cathode is connected to ground through a cathode resistor 449. A plate load resistor 451 equal in magnitude to the cathode resistor 449 connects the plate 446 of the tube 442 to the same potential as does the plate load resistor 428 of the tube 404. The two phase output of the phase splitter tube 442 is made available to the bistable Eccles-Jordan trigger circuit 470 also referred to herein as a flip-flop circuit.

A four position selector switch 462 is in circuit between the phase splitter 442 and the flip-flop circuit 470. The four position switch 462 includes a pair of contactor arms 464 and 466. The contactor arms 464 and 466 are linked so that they move as a unit. The contactor arm 464 of the switch 462 cooperates with the switch contacts 455, 456, 457, and 458. The contactor arm 466 of the switch 462 cooperates with corresponding contacts 463, 465, 467, and 468. The plate 446 of the phase splitter tube 442 is coupled through the condenser 452 to the stationary contact 455 adapted for cooperation with the contactor arm 464 and also to the stationary contact 465 adapted for cooperation with the contactor arm 466. The cathode 448 is coupled by means of the condenser 454 to the contact 456 adapted for cooperation with the contactor arm 464 and to the contact 463 adapted for cooperation with the contactor arm 466. The contact 458 adapted to cooperate with the contactor 464 is connected directly to ground. The corresponding contact 468 adapted to cooperate with the contractor 466 and which contact is also connected to the contact 457, is connected to the negative potential junction between the resistors 481 and 482. The resistors 481 and 482 comprise a voltage divider. One end of the resistor is connected, 482 is connected to ground lead 14 and the remote end of resistor 481 is connected to terminal 496, to which there is adapted to be connected a negative potential source, not shown. The contact 467 adapted for cooperation with the contactor 466 is connected to the junction between resistors 469 and 471. The resistors 469 and 471 comprise a voltage divider. One end of resistor 471 is grounded and the remote end of resistor 469 is connected to the plate supply lead 176 which, in turn, is connected to the terminal 10. The junction between resistors 469 and 471 is at a positive potential with respect to ground.

The flip flop 470 includes a pair of pentodes 472 and 474. The pentode 472 includes a plate 475, a suppressor grid 476, a screen grid 477, a control grid 478 and a cathode 479. The suppressor grid 476 is connected to the cathode 479. The cathode 479 is grounded by direct connection to the ground lead 14. A plurality of resistors 480, 481, and 482, connect control grid 478 of the tube 472 to ground. The tube 474 includes a plate 483, a suppressor grid 484, a screen grid 485, a control grid 486, and a cathode 487. Suppressor grid 484 is connected to the cathode 487. The cathode 487 is grounded by direct connection to the ground lead 14. There is provided a pair of identical plate load resistors 488 and 489, resistor 488 being for the plate 475 of the tube 472 and resistor 489 being for the plate 483 of tube 474 to connect the respective plates to the plate supply terminal 10 through the resistor 432 and the condenser 434, through the jumper lead 174 and the plate supply lead 176. The plate of each tube of the flip flop is connected in circuit with the grid of the other tube of the flip flop. The plate 475 of the tube 472 is connected to the control grid 486 of the tube 474 through a resistor 490. The plate 483 of the tube 474 is connected to the control grid 478 of the tube 472 through a resistor 491, which is identical to the resistor 490. A capacitor 492 couples the screen grid 477 of tube 472 and the control grid 486 of tube 472. The resistor 491 is shunted by the radio frequency capacitor 493. The control grid 486 is connected to terminal 496 through a grid resistor 494. The terminal 496 is adapted for connection to a source of negative potential, as previously described. The screen grid 485 of the tube 474 is connected through a lead 495 directly to the screen grid 477 of the tube 472 and resistor 495*a* connects the lead 495 to the plate supply for tubes 472 and 474 at the junction of plate resistors 488 and 489. The output of the flip flop is derived at the plate 483 and is fed to the tap 513 of potentiometer 507 in the ring modulator 502 through leads 497 and 498 and resistor 499. When the switch is so positioned that the contactor is in engagement with the contact 455 and the contactor 466 is in engagement with the contact 463, the switch is in normal code position. The plate 446 of the phase-splitter tube 442 sends a positive direction pulse to the control grid 478 of the flip flop tube 472, allowing that tube to conduct. Simultaneously, the cathode 448 of the phase-splitter tube 442 sends a negative direction pulse to the control grid of the other flip flop tube 474. The negative pulse cuts off the tube 474 which in turn supplies a strong positive potential to the control grid 478 of tube 472 and tap 513 from its plate 483. The tube 472 is allowed to saturate with a subsequent drop in its plate voltage. This condition will persist until another code pulse of opposite polarity is impressed at the input terminal 402 of the code input amplifier tube 404. Therefore, the potential of the tap 513 of potentiometer 507 either is raised to a predetermined positive potential or is lowered to a predetermined negative potential in accordance with the pulses injected at the terminal 402.

When the switch 462 is in such position that the contactor 464 is in engagement with the fixed contact 456, and the contactor 466 is in engagement with the fixed contact 465, the switch is in "code reverse position." The plate 446 of the phase-splitter tube 442 sends a positive direction pulse to the control grid 486 of the flip flop tube 474 allowing tube 474 to conduct. Simultaneously, the cathode 448 of the phase splitter tube 442 sends a negative direction pulse to the control grid 478 of the flip flop tube 472. This negative pulse aided by the negative potential supplied from the plate 483 of the flip flop tube 474 due to the current flow therethrough, cuts off the flip flop tube 472, allowing its plate voltage to rise. This condition persists until another code pulse of opposite polarity is impressed at the input terminal 402 of the code input amplifier tube 404. Therefore, the only difference accomplished by switching the contactors clockwise as shown on the drawing from their first position to their second position is that the reverse effect is obtained in the second position of the switch 462 from that obtained in the first counter clockwise position of the switch 462 due to an input pulse of the same polarity at the code input terminal 402.

When the switch 462 is oriented so that the contactor 464 is engaged with the contact 458 and the contactor 466 is engaged with the contact 468, which position is the normal no-code position, the control grid 478 of the multivibrator tube 472 is placed at ground potential. This allows the tube 472 to conduct. The control grid 486 of the multivibrator tube 474 is placed at a negative potential cutting off the tube 474. This causes a drop in voltage at the plate 475 of the tube 472 simulating the "normal code position" of the switch 462 with a positive incoming code pulse.

When the switch 462 is oriented to the position where the contactor 464 is in engagement with the contact 457 and the contactor 466 is in engagement with the contact 467, which is the "no-code reverse" position of the switch, the control grid 486 of the multivibrator tube 474 is placed above ground potential, allowing the tube 474 to conduct. The control grid 478 of the multivibrator tube 472 is placed at a negative potential cutting off the tube 472. This causes a rise in voltage at the plate 475 of the multivibrator tube 472, simulating the "reverse code" position with a positive incoming code pulse at the terminal 402. Therefore, by manual control of the switch between the latter two positions described, the same effect is achieved as when the flip flop 470 is controlled by incoming pulses at the terminal 402.

The output of the flip flop being applied, cause the output radio frequency voltage at the terminal 514 of the modulator 184 to have the same phase as the carrier in the modulator 84 or to be 180° out of phase therewith. The output of modulator 502 is amplified in the pentode amplifier 522. By means of the coupling transformer 524, the primary of which is in the tuned plate circuit of the amplifier 522, the carrier frequency is reinserted at the plate 188 of the amplifier tube 186. The phase of the detected audio output is determined by the polarity of the D.C. voltage applied to tap 513 by the multivibrator 470.

Obviously many modifications and variations of the present invention are possible in the light of the above teachings. It is, therefore, to be understood that within the scope of the appended claims the invention may be practiced otherwise than as specifically described.

I claim:

1. A phase control system for encoding or decoding a signal input thereto comprising; an oscillator for providing at its output a carrier of a frequency that can be amplitude modulated by the input signal, a first balanced modulator means having an input for the carrier, said input being coupled to the output of said oscillator, said first balanced modulator means also having an input for a control voltage, a flip flop circuit that has two stable operating conditions and is selectively controllable to either operating condition and producing a constant direct current voltage output in one of its stable operating conditions and producing a constant direct current voltage output of equal magnitude but opposite polarity in the other of its stable operating conditions, said flip flop being coupled to the control voltage input of said first modulator means, whereby the output of said first modulator means is the carrier for both stable operating conditions of said flip flop, the carrier outputs from said first modulator means for the two stable operating conditions respectively of said flip flop being 180 degrees out of phase, a second balanced modulator means having an input for the carrier coupled to the output of said oscillator, said second balanced modulator means also having an input for accepting any signal input to said phase control system, a source of direct current voltage that is selectively adjustable, means for modifying the direct current voltage level of a signal input to said phase control system by arithmetically combining input signal voltage and the voltage of said direct current voltage source and for coupling a selected percentage of the resultant voltage into the signal input of said second balanced modulator means, said direct current voltage source being adjustable to a level such that the output from said second balanced modulator means during a signal input thereto is of the character of double sideband suppressed carrier, means coupled to the outputs of both said modulator means for combining the carrier from said first modulator means with the output from said second modulator means, the carrier combined with the output from said second modulator means being either in phase with the suppressed carrier or 180 degrees out of phase with the suppressed carrier, and a detector connected to the output of said combining means whereby for one of the two stable conditions of said flip flop the output of said detector is similar to the input signal and for the other stable condition of said flip flop the output of said detector is substantially complementary to the input signal.

2. A phase control system for encoding or decoding a signal input thereto comprising; an oscillator for providing at its output a carrier of a frequency that can be amplitude modulated by the input signal, a first balanced modulator means having an input for the carrier, said input being coupled to the output of said oscillator, said first balanced modulator means also having an input for a control voltage, a circuit that has two stable operating conditions and is selectively controllable to either operating condition and producing a constant direct current voltage output in one of its stable operating conditions and producing a constant direct current voltage output of equal magnitude but opposite polarity in the other of its stable operating conditions, said circuit being coupled to the control voltage input of said first modulator means, whereby the output of said first modulator means is the carrier for both stable operating conditions of said circuit, the carrier outputs from said first modulator means for the two stable operating conditions respectively of said circuit being 180 degrees out of phase, a second balanced modulator means having an input for the carrier coupled to the output of said oscillator, said second balanced modulator means also having an input for accepting any signal input to said phase control system, a source of direct current voltage that is selectively adjustable, means for modifying the direct current voltage level of a signal input to said phase control system by arithmetically combining input signal voltage and the voltage of said direct current voltage source and for coupling a selected percentage of the resultant voltage into the signal input of said second balanced modulator means, said direct current voltage source being adjustable to a level such that the output from said second balanced modulator means during a signal input thereto is of the character of double sideband suppressed carrier, means coupled to the outputs of both said modulator means for combining the carrier from said first modulator means with the output from said second modulator means, the carrier combined with the output from said second modulator means being either in phase with the suppressed carrier or 180 degrees out of phase with the suppressed carrier, and a detector connected to the output of said combining means whereby for one of the two stable conditions of said circuit the output of said detector is similar to the input signal and for the other stable condition of said circuit the output of said detector is substantially complementary to the input signal.

References Cited in the file of this patent

UNITED STATES PATENTS

| | | |
|---|---|---|
| 1,428,156 | Espenschied | Sept. 5, 1922 |
| 1,550,660 | Affel | Aug. 25, 1925 |
| 1,716,573 | Armstrong | June 11, 1929 |
| 2,424,971 | Davey | Aug. 5, 1947 |
| 2,509,621 | Willoughby | May 30, 1950 |
| 2,575,904 | Bischoff | Nov. 20, 1951 |
| 2,676,245 | Doelz | Apr. 20, 1954 |